Sept. 26, 1961   J. C. FISHER   3,002,116
THERMIONIC GENERATOR
Filed Nov. 3, 1958   2 Sheets-Sheet 1

Inventor:
John C. Fisher,
by Paul A. Frank
His Attorney.

Inventor:
John C. Fisher,
by Paul A. Frank
His Attorney.

United States Patent Office 3,002,116
Patented Sept. 26, 1961

---

3,002,116
THERMIONIC GENERATOR
John C. Fisher, Schenectady, N.Y., assignor to General Electric Company, a New York corporation
Filed Nov. 3, 1958, Ser. No. 771,514
13 Claims. (Cl. 310—4)

This invention relates to a converter apparatus for converting energy in the form of heat directly to electrical energy and more particularly relates to an improved and novel converter apparatus facilitating a very minute clearance between electrodes of the converter.

In the conversion of heat energy to electrical energy by thermionic converters of the type having a heated cathode and a spaced relatively cool anode enclosed in a chamber of a high vacuum or low pressure gas, serious limitations in output current capacity and efficiency of the converter are imposed by space charge effects within the converter presenting an impediment to the free flow of current between electrodes of the converter. Such a space charge may result from an aggregate of the individual charges of electrons in a cloud of electrons in transit between the cathode electrode and anode electrode of the converter and spaced somewhat from each. This relatively high charge of negative polarity has a repelling or retarding influence on electrons newly emitted from the cathode of the converter which are also negatively charged, thereby reducing the flow of current and consequently the efficiency and power density of the converter.

In the present invention, the adverse effects of a space charge between electrodes of a thermionic converter are eliminated or greatly minimized by establishing and maintaining a very minute clearance between anode and cathode of the converter. The tendency to form a space charge between electrodes is largely overcome by reason of the fact that the emitted electrons are collected at the anode of the converter quickly and before any appreciable number thereof can form a cloud in the space between electrodes. Thus, the newly emitted electrons enter a space which is relatively free from space charge effects whereby larger currents may be produced with the same amount of input heat applied to the cathode, increasing the efficiency and power density of the converter.

In accordance with a feature of this invention, the cathode to anode spacing in a thermionic converter is automatically maintained during operation thereof by the pressure of a thin gaseous medium between the anode and cathode holding them apart. The thin gaseous medium may be created by bringing the surface of a vaporizable anode electrode into near contact with a hot cathode electrode. Vaporization of the surface portion of the anode produces a film of gas between the electrodes, which may be unusually thin. Such a film is automatically responsive to variations in spacing and various influences resulting therefrom to engender compensating and correcting action to adjust the spacing to its original value. A decreased spacing between electrodes increases the pressure spreading the same apart to bring the spacing to its original value and increased spacing therebetween decreases the pressure spreading the same apart to allow the spacing to return to its original value. The present invention is in the nature of an improvement on the thermionic converter disclosed and claimed in the copending application of Volney C. Wilson, Serial No. 698,552, filed November 27, 1957, and assigned to the assignee of the present invention.

It is a primary object of this invention to overcome the adverse effects of space charge in a thermionic converter.

It is another object of this invention to automatically establish and maintain a minute spacing between electrodes in a thermionic converter.

Other and further objects and advantages will become apparent from a perusal of the following detailed description of the invention considered with the accompanying drawings in which.

Figures 1, 2:
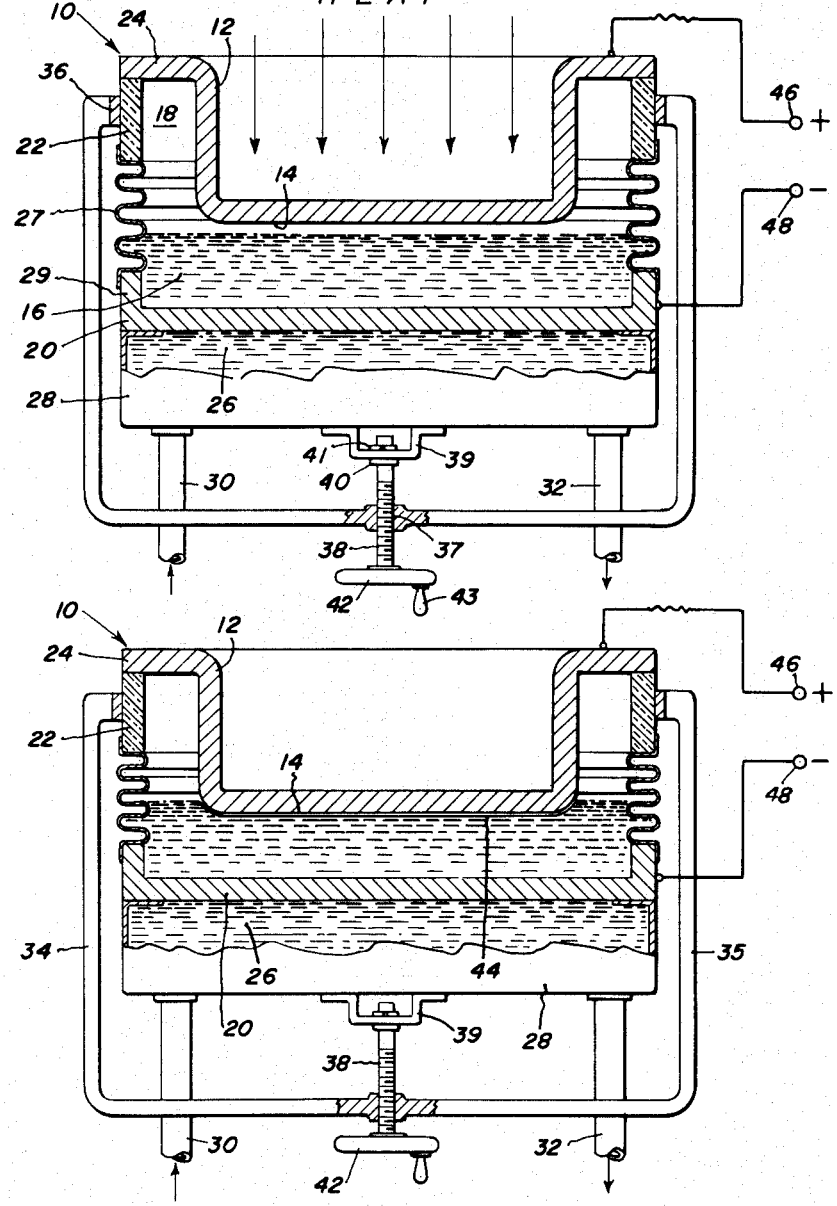
FIG. 1 shows in cross-sectional elevation a thermionic converter according to the invention in an inactive condition.
FIG. 2 shows the thermionic converter of FIG. 1 in an operating condition.

Referring now to FIGS. 1 and 2 of the drawings, 10 represents generally a thermionic converter according to the invention having a generally cup-shaped cathode electrode 12 for providing a source of electrons emitted from a surface portion 14 thereof in response to external application of sufficient heat thereto as indicated by the arrows in the figure. According to a feature of my invention, an anode electrode 16, which may be a suitable liquid or solid as hereinbelow more specifically described and the emissive surface 14 are confined in a sealed volume 18 and are mounted for movement toward and away from each other. Volume 18 is formed by a cup-shaped anode retaining member 20, a cylindrical, resilient bellows type of member 27 preferably of some suitable metal which at one end is secured as by welding or other bond to a rim 29 of member 20 and at the other end is bonded to one end of a ceramic spacer 22. The other end of ceramic spacer 22 is bonded to a peripheral flange 24 of cathode electrode 12 which completes the enclosure of the volume 18.

The anode 16 and anode retaining member 20 are retained at a temperature cool, relative to cathode 12 by a coolant 26 circulated in a tank 28 having peripheral portions sealed against the surface of the anode retaining member 20. Suitable inlet and discharge conduits 30 and 32 admit and discharge the coolant which absorbs excess heat transferred to the anode and its retaining member from the cathode.

Bellows member 27 facilitates movement of the anode and cathode toward and away from each other and to effect such movement, a spider bracket is provided with a plurality of 3 or 4 arms, for example, such as shown at 34 and 35 secured at their upper ends as viewed in FIGS. 1 and 2, to a ceramic spacer 22 through a ring 36. The arms extend along a portion of the height of the converter and then at right angles to merge at a central point at which a threaded bore 37 through the composite of arms accommodates a screw 38. The screw extends through an opening in a bracket 39 secured to an outer portion of tank 28 and is restrained from axial movement relative to the bracket by a flange 40 and a snap ring 41 fitting in a groove of the screw while relative rotational movement therebetween may occur. Accordingly, rotation of the screw 38 by wheel 42 and handle 43 integral with the screw is effective to move the cathode and anode relative to each other since the brackets and screw are rigid and bellows member 27 acommodates such movement.

According to a preferred embodiment of the invention, cathode 12 is constructed of a suitable metal such as molybdenum and anode 16 may be formed of cesium, although each of these components may consist of various different metals or other materials and the material of anode 16 may be either in a liquid or a solid state. As observed in the drawings, the space between emissive surface 14 and anode retaining member 20 contains material of anode 16.

To initiate operation of the converter, the cathode electrode 12 is heated to the point of copius electron emissivity from surface 14. Anode 16 and anode retaining member 20 are raised from the positions shown in FIG. 1 to the positions shown in FIG. 2 wherein anode 16 approaches very closely the heated cathode surface 14. Heat is transferred from the cathode to the anode with such intensity that the adjacent surface of the anode is quickly heated to a temperature of vaporization to form a thin gaseous film or medium 44 between the cathode and the main body of the anode. Such a gaseous film is shown grossly exaggerated in the drawing for purposes of clear illustration, it being understood, however, that the thickness of this film may be one hundred thousandth or even one millionth of an inch. The pressure within the film is relatively low whereby electrons emitted from the surface 14 encounter relatively few molecules of gas of the film. Thus, a very small cathode to anode spacing is achieved whereby a large electron current density may be obtained. Such electron flow is from the cathode to the anode whereby an electrical output is produced at terminals 46 and 48 connected, respectively, to the cathode and anode retaining member. The anode is of negative polarity while the cathode is positive.

The creation and continuance of a gaseous medium or film 44 can best be explained by reference to a somewhat analogous and more familiar situation wherein a drop of water is placed on a hot plate. The drop of water rests on a thin film of vapor between the hot plate and the drop of water which to a large extent insulates the drop and deters the transfer of heat thereto. In a similar manner, the vaporized surface portion of anode 16 provides considerable insulation between the cathode and anode and lessens the transfer of heat to the anode whereby the vast bulk of the anode is not vaporized and remains in its original state. For predetermined temperatures of cathode and anode the gaseous film created according to the invention herein, assumes and automatically remains at a stable, uniform value of thickness and any departure from this value automatically engenders compensating influences to adjust the spacing to its original value. Variations in spacing from a predetermined value affect the transfer of heat to the gaseous film which in turn affects the pressure thereof in accordance with well known principles. A decrease in such spacing at a point is effective to increase the transfer and dissipation of heat at that point, raising the gaseous film pressure to force the anode away from the cathode and an increase in spacing lowers the transfer and dissipation of heat to lower the pressure and allow the anode to approach the cathode.

Some factors which affect a stable arrangement such as described are the heat conduction into the gaseous medium, the electrical conduction therethrough, the electric field thereacross, the electrostatic image charges, the temperature gradient thereacross and the electrostatic attraction between electrodes. The direct heat conduction and electrical conduction transfer more heat to the anode to increase the vapor pressure. The electric field existing by reason of the potential difference between electrodes and the electrostatic image charges existing at the anode by reason of the charges on the electrons each has the effect of lowering the work function of the cathode to increase the current flow and accordingly the heat transfer. The temperature gradient directly affects the pressure against the respective electrodes by their own vapor to vary the force spreading the surfaces in proportion to the temperature gradient. Lastly, the electrostatic attraction between electrode surfaces imposes a force pulling the electrodes together. These different influences may be proportioned to provide a stable arrangement wherein the film thickness remains substantially constant and very thin. The spacing between electrodes may be made so small that the adverse effects of space charge are very small with a consequent increase in output current relative to the heat input to the converter. That is, the efficiency may be largely increased.

Under certain circumstances it may occur that in initiating operation of the converter, the anode fails to heat quickly enough to form the described gaseous film. Under such circumstances the anode and cathode surfaces would touch each other resulting in heating of the entire body of the anode uniformly without creation of the mentioned gaseous film. To overcome such a possibility, an inert gas such as argon, krypton or xenon or any other gas inert with respect to the elements exposed to chamber 18 may be introduced within the chamber. With such a gas within the chamber, as anode 16 is brought close to the cathode surface 14 to initiate converter operation, the compression of the inert gas produces a pressure resisting contact between the anode and cathode while allowing the same to come very close to each other. The gas so compressed diffuses away from this region. However, the retarding effect thereof before complete diffusion takes place produces sufficient time delay to allow the anode surface to receive sufficient heat to become vaporized to form the gaseous film 44. In other respects, a converter including an inert gas in chamber 18 operates as the converter without such a gas.

Figure 3:
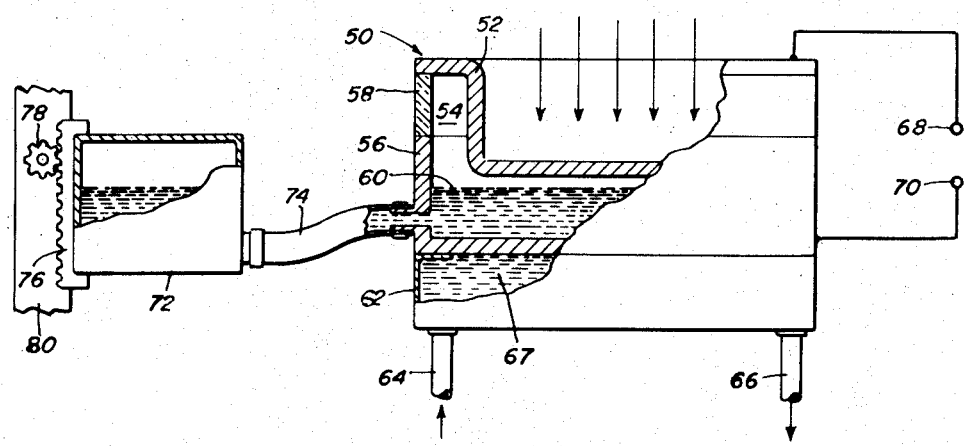
FIG. 3 shows a modified apparatus for starting or stopping operation of a thermionic converter according to my invention.

Referring now to FIG. 3 illustrating an alternative embodiment of converter according to my invention, 50 represents generally the converter in its entirety which is similar to converter 10 with the exception that a bellows member and spider bracket, both utilized in the converter 10 are not utilized in the converter 50. Instead, the converter 50, includes a cathode 52 similar in construction and function to cathode 12, forming an enclosed volume 54 together with a cup shaped anode retaining member 56 and a ceramic ring 58 disposed therebetween and bonded to each. An anode 60 of liquid cesium or other suitable liquid is provided within chamber 54. Heat as indicated by the arrows may be applied to the cathode from any suitable source and a tank 62 having inlet and outlet conduits 64 and 66, respectively, for circulating a suitable coolant 67 is provided for cooling anode 60 to an optimum operating temperature when the converter is operating. Suitable output line connections may be made between cathode 52 and anode retaining member 56 and terminals 68 and 70. The different elements of the converter 50 may be of the same material as corresponding parts of converter 10 as hereinabove set forth, with the single exception that anode 60 must necessarily be in a liquid state.

In the inactive condition of converter 50, the level of anode 60 is substantially as shown in FIG. 3 wherein it is spaced relatively far from the cathode. To initiate operation of the converter, a reservoir 72 containing fluid of anode 60 and communicating with volume 54 through a flexible conduit 74 and through appropriate apertures in retaining member 56 and reservoir 72, may be raised whereby the anode liquid pours from reservoir 72 into the anode retaining member 56. Thus, the level in volume 54 may be made sufficiently high to bring the anode surface close enough to the cathode to establish a gaseous film between the two as hereinabove described whereby the converter operates in the manner of converter 10. Lowering of reservoir 72 is effective to lower the anode level and stop the operation of the converter.

Raising and lowering reservoir 72 may be accomplished in any suitable manner as by mounting the same on a rack 76 having teeth engageable with a pinion 78 and being slidable along guides on a fixed guideway 80. Thus, rotation of the pinion in the appropriate direction moves the reservoir accordingly.

Figure 4:
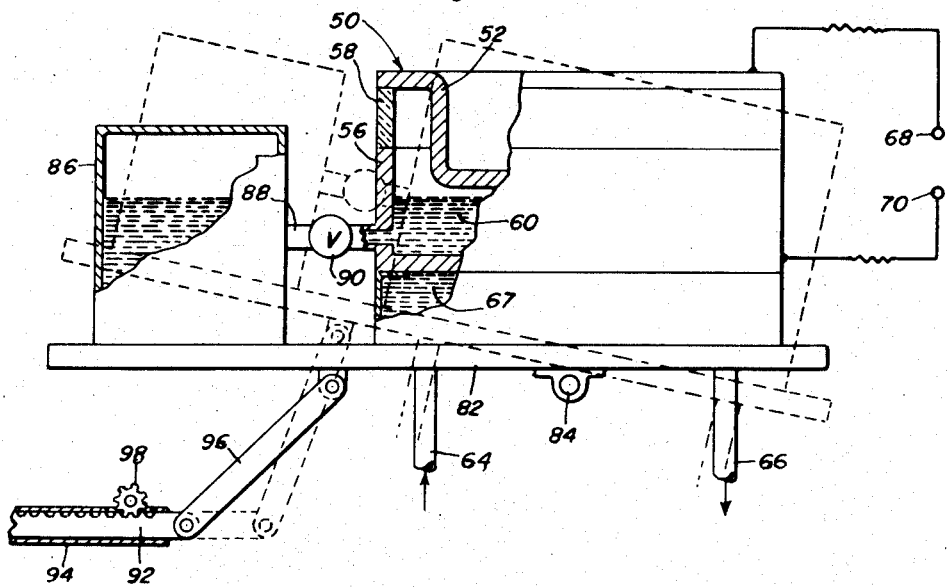
FIG. 4 shows still another modified apparatus for starting or stopping operation of a thermionic converter according to my invention.

As shown in FIG. 4 of the drawing, the converter 50 may be conditioned for operation or inactivated by raising and lowering the level of the anode 60 by mounting the converter on a tiltable platform 82 which is pivotally supported at 84. A reservoir 86 containing anode fluid is also mounted on platform 80 and communicates with volume 54 through a conduit 88 controlled by a valve 90.

The tilting of platform 80 may be accomplished by a rack 92 slidable in a fixed guideway 94 and being attached to an arm 96 pivotally joined to the end of the rack and to the platform 80. A pinion 98 having teeth engageable with teeth on rack 92 may be rotated to effect longitudinal movement of rack 92 to control the tilting of the platform. Thus, the platform may be tilted and valve 90 opened until anode fluid flows into volume 54 in sufficient quantity that in a level condition it comes into very near contact with cathode 52 after which valve 90 may be closed and the converter leveled by returning the platform 80 to a horizontal position. To lower the level of the anode fluid the platform may be tilted in the other direction and valve 90 opened.

Having thus described this invention in such full, clear, concise and exact terms as to enable any person skilled in the art to which it pertains, to make and use the same and having set forth the best mode contemplated of carrying out this invention, I state that the subject matter which I regard as being my invention is particularly pointed out and distinctly claimed in what is claimed, it being understood that equivalents or modifications of or substitutions for parts of the above specifically described embodiment of this invention may be made without departing from the scope of the invention as set forth in what is claimed.

What I claim as new and desire to secure by Letters Patent of the United States is:

1. An apparatus comprising a conductive cathode electrode and a conductive vaporizable anode electrode spaced from said cathode electrode in a vacuum tight chamber, means for disposing said anode electrode in close proximity to said cathode electrode, said cathode being responsive to the close disposition of the anode thereto and the application of heat thereto to radiate heat to said anode electrode and vaporize the surface portion thereof in proximity to said cathode electrode to form a thin gaseous film under pressure between said electrodes for maintaining the spacing therebetween.

2. An apparatus comprising a vacuum tight chamber containing a conductive cathode electrode, a fluent, conductive, vaporizable anode electrode movable to a position closely spaced from said cathode, the surface of said anode electrode being vaporizable to form a thin gaseous film between said electrodes responsive to temperature changes to change the pressure thereof, the pressure of gas in said film being effective to maintain the spacing between said electrodes substantially constant.

3. An apparatus comprising a vacuum tight chamber cathode electrode and a relatively cool, vaporizable anode electrode, closely spaced from said cathode electrode, means for adjustably disposing said anode electrode in proximity to said cathode electrode, means for maintaining the cathode electrode hot relative to said anode electrode, the temperature of said cathode electrode being sufficiently high to vaporize the surface portion of said anode to form a thin, gaseous film between said electrodes, the pressure of gas in said film being effective in maintaining the electrodes in said spaced relationship.

4. An apparatus comprising a cathode electrode and a vaporizable anode electrode closely spaced from said cathode electrode, said electrodes being enclosed in an evacuated chamber, means for maintaining said cathode electrode hot relative to said anode electrode, the temperature of said cathode electrode being sufficiently high to vaporize the surface portion of said anode electrode and means for disposing said anode in proximity to said cathode to vaporize the adjacent surface portion of said anode to form a thin gaseous film between said electrodes, the pressure of gas in said film being effective in maintaining the same spaced.

5. An apparatus comprising a hot cathode electrode and a relatively cold vaporizable anode electrode closely spaced from said cathode electrode, said electrodes being enclosed in a sealed chamber having a relatively inert gas at low pressure therein, means for maintaining the relative temperatures of said electrodes, the temperature of said cathode electrode being sufficiently high to vaporize the surface portion of said anode electrode to form a thin gaseous film between said electrodes, the pressure of said gaseous medium being inversely variable with the spacing between said electrodes to maintain a predetermined spacing therebetween.

6. An apparatus comprising a hot cathode electrode and a relatively cool vaporizable anode electrode closely spaced from said cathode electrode, the emitting surface of said cathode electrode and said anode electrode being enclosed in a sealed chamber, the surface portion of said anode electrode being vaporizable by said hot cathode electrode to form a thin gaseous film therebetween, said gaseous film being responsive to differentials in spacing between said electrodes to form pressure differentials therebetween inversely variable with the spacing differentials to effect return of said electrodes to their original spacing.

7. An apparatus comprising a cathode electrode and a liquid, vaporizable anode electrode spaced from said cathode electrode, said electrodes being enclosed in an evacuated chamber, means for bringing said anode electrode into near contact with said cathode electrode, and means for heating said cathode electrode for vaporizing the surface of said anode electrode and establishing a gaseous film between said electrodes to maintain a predetermined small spacing therebetween.

8. An apparatus comprising a cathode electrode and a vaporizable anode electrode closely spaced from said cathode electrode, said anode electrode being in a liquid state, said electrodes being enclosed in an evacuated chamber, means for maintaining said cathode electrode hot relative to said anode electrode, the temperature of said cathode electrode being sufficiently high to vaporize the surface portion of said anode electrode adjacent thereto and means for disposing said anode electrode in proximity to said cathode to vaporize the adjacent surface portion of said anode to form a thin gaseous film between said electrodes having sufficient pressure for maintaining the electrodes in spaced relationship.

9. An apparatus comprising a cathode electrode having a continuous outer periphery, a fluid container having a continuous outer periphery and means joining the continuous peripheries of said container and said cathode, said means including an insulator and a flexible bellows facilitating relative movement between said container and said cathode electrode, an anode electrode means being in a fluid state and contained in said container and means for moving said container and said anode electrode relative to said cathode electrode, and means for raising the temperature of said cathode electrode to a value of vaporization of said anode electrode to vaporize the surface of said anode adjacent to said cathode to establish a thin gaseous film between said electrodes for maintaining the same in constant spaced relationship.

10. An apparatus comprising an evacuated chamber including a container and a cathode electrode spaced therefrom, said cathode electrode and said container being in insulated relationship, a reservoir external to said chamber, an aperture in said chamber and means establishing communication between said reservoir and the interior of said chamber through said aperture, an anode liquid contained in said reservoir and means for elevating and lowering said reservoir to effect flow of said anode liquid into or from said chamber to bring the surface level of said anode liquid within said chamber to a point near said cathode electrode, and means for heating said cathode electrode to a value of vaporization of said anode electrode whereby said anode electrode is vaporizable to form a thin gaseous film between said electrodes to maintain the spacing therebetween.

11. An apparatus comprising a sealed chamber including a container having a cathode mounted at one end thereof, said cathode and container being in insulated relationship with respect to each other, an opening in said container, a reservoir having an anode liquid therein and means for establishing communication between said reservoir and the interior of said chamber through said opening in said container, valve means controlling said communication, and means for tilting said reservoir and said chamber to effect flow between said reservoir and said chamber, whereby the level of said anode liquid in said chamber may be brought to close proximity to said cathode electrode, and means for elevating the temperature of said cathode electrode to a point of vaporization of said anode liquid to form a thin gaseous film between said electrodes, said film being responsive to changes in spacing between said electrodes to alter the pressure thereof to maintain the spacing therebetween.

12. An apparatus comprising a cathode electrode and a liquid, vaporizable anode electrode spaced from said cathode electrode, said electrodes being enclosed in an evacuated chamber, means for maintaining said cathode electrode hot relative to said anode electrode, the temperature of said cathode electrode being sufficiently high to vaporize the surface portion of said anode electrode and means for raising the level of said anode electrode in said chamber to bring the surface thereof into close proximity to said cathode electrode to vaporize the adjacent surface portion of said anode electrode to form a thin gaseous medium between said electrodes, the pressure of said gaseous medium being effective to maintain a relatively constant spacing between said electrodes.

13. An apparatus comprising a conductive cathode electrode and a conductive, vaporizable anode electrode spaced from said cathode electrode, means for adjustably disposing said anode electrode in close proximity to said cathode electrode, means effective to heat the surface portion of said anode electrode adjacent to said cathode electrode to a temperature of vaporization thereof to form a thin gaseous medium under pressure between said electrodes for maintaining the spacing therebetween.

References Cited in the file of this patent
UNITED STATES PATENTS

| | | |
|---|---|---|
| 1,451,271 | Rentschler | Apr. 10, 1923 |
| 1,701,840 | Donle | Feb. 12, 1929 |
| 2,071,748 | Hund | Feb. 23, 1937 |
| 2,617,064 | Lewin | Nov. 4, 1952 |
| 2,736,800 | Bruijning | Feb. 28, 1956 |
| 2,740,915 | Jennings | Apr. 3, 1956 |